(12) United States Patent
Soga

(10) Patent No.: US 6,238,016 B1
(45) Date of Patent: May 29, 2001

(54) DEVICE FOR CONTROLLING BRAKE SYSTEM OF VEHICLE WITH CHECKING OF BATTERY CONDITION

(75) Inventor: Masayuki Soga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/440,587

(22) Filed: Nov. 15, 1999

(30) Foreign Application Priority Data

Dec. 21, 1998 (JP) ................................................ 10-362906

(51) Int. Cl.$^7$ ........................................................ B60T 8/88
(52) U.S. Cl. ........................................................ 303/122.04
(58) Field of Search ............................. 303/122, 122.01, 303/122.02, 122.04, 122.05, 115.2

(56) References Cited

U.S. PATENT DOCUMENTS

| | | | |
|---|---|---|---|
| 4,222,615 | * | 9/1980 | Ang et al. ............................ 303/92 |
| 4,340,935 | * | 7/1982 | Anlauf ................................. 364/426 |
| 4,661,910 | * | 4/1987 | Reinecke et al. ..................... 364/426 |
| 4,722,576 | * | 2/1988 | Matsuda ............................... 303/92 |
| 5,129,713 | * | 7/1992 | Matsuda ............................... 303/92 |
| 5,494,343 | * | 2/1996 | Lindenman et al. ............... 303/122.12 |
| 5,648,759 | * | 7/1997 | Miller et al. ......................... 340/660 |
| 5,795,039 | * | 8/1998 | Fennel et al. .................... 303/122.05 |
| 5,798,629 | * | 8/1998 | Terauchi ............................... 320/15 |
| 5,944,391 | * | 8/1999 | Bezos .................................. 303/15 |
| 6,158,822 | * | 12/2000 | Shirai et al. ........................... 303/3 |
| 6,161,904 | * | 12/2000 | Schmidt et al. ................. 303/122.09 |
| 6,166,649 | * | 12/2000 | Inoue ................................. 340/660 |

FOREIGN PATENT DOCUMENTS

| | | |
|---|---|---|
| 7-17375 | 1/1995 | (JP) . |
| 10-100884 | 4/1998 | (JP) . |

\* cited by examiner

*Primary Examiner*—Douglas C. Butler
*Assistant Examiner*—Benjamin A. Pezzlo
(74) *Attorney, Agent, or Firm*—Oliff & Berridge, PLC

(57) ABSTRACT

A device for controlling an electro-hydraulic brake system of a vehicle checks if a battery forming an electric power source for the electric part of the brake system is in its normal operating condition, by taking a chance that thevehicle is substantially stopped with a brake pedal not being substantially depressed by a driver, wherein the checking is carried out if the outlet voltage of the battery is lower than a predetermined voltage in a substantially loaded condition by momentarily driving a motor-driven pump forming a pressurized brake fluid source for the hydraulic part of the brake system with at least one wheel being braked by the pressurized brake fluid.

6 Claims, 4 Drawing Sheets

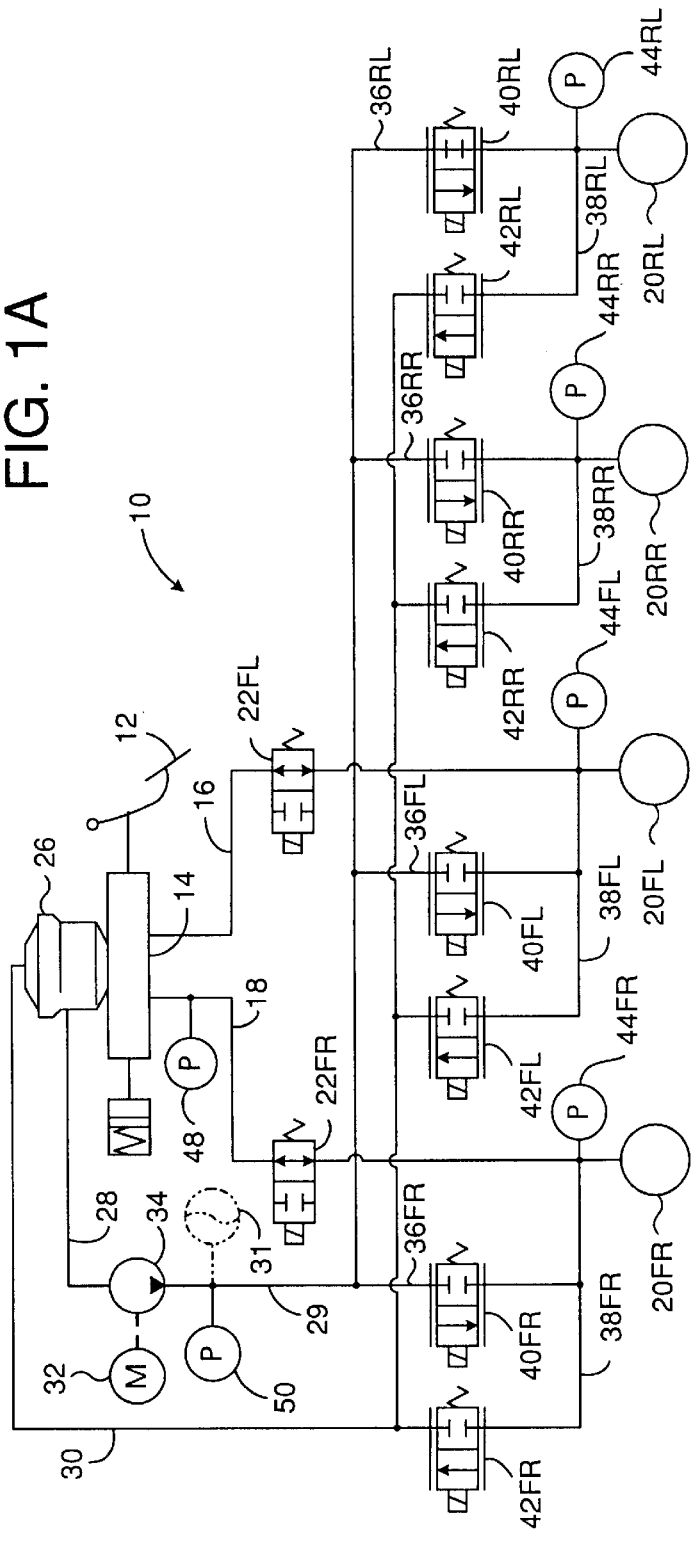
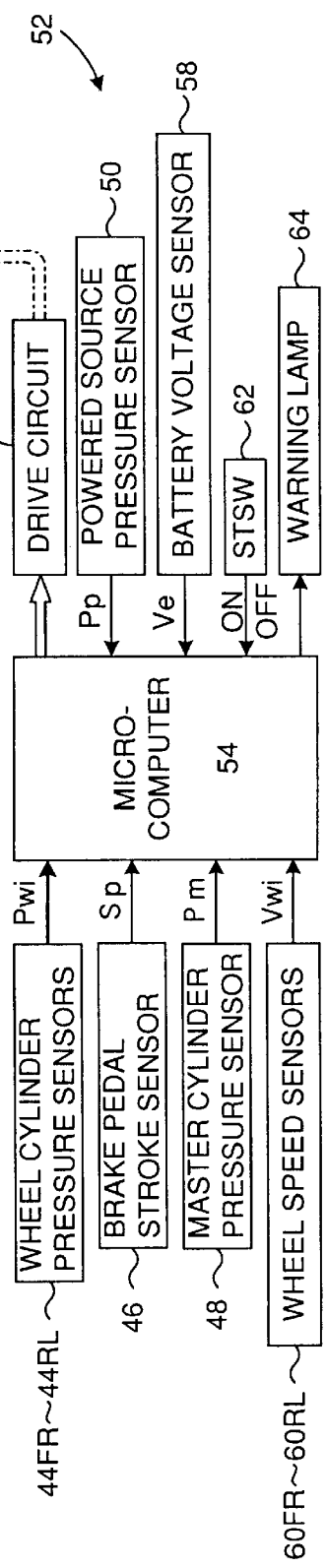
FIG. 1A
FIG. 1B

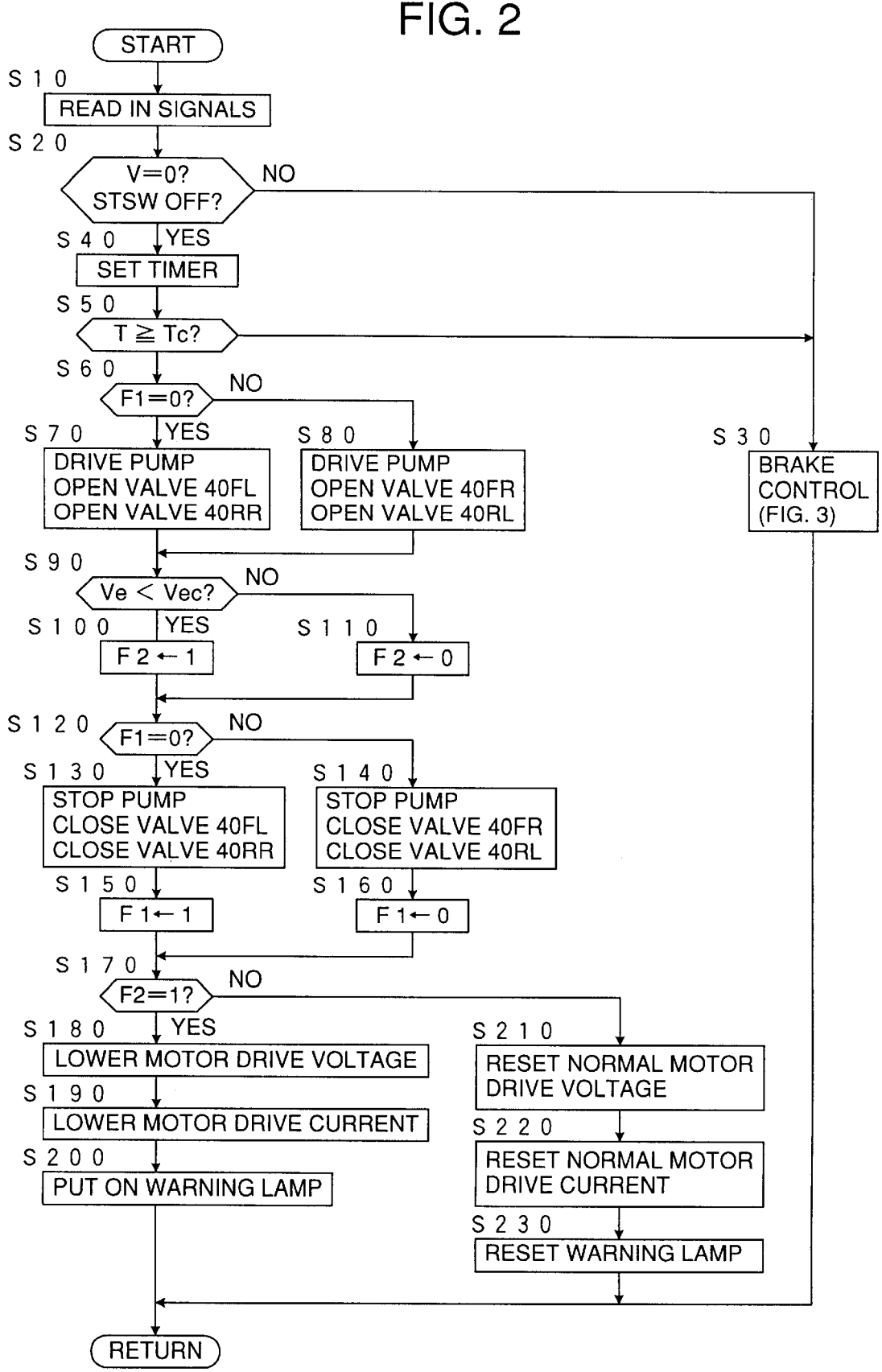

DEVICE FOR CONTROLLING BRAKE SYSTEM OF VEHICLE WITH CHECKING OF BATTERY CONDITION

BACKGROUND OF THE INVENTION

1. Field of the Invention

The present invention relates to a device for controlling an electric or electro-hydraulic brake system of a vehicle such as an automobile against an unusual lowering of the output voltage of a battery forming an electric power source of the electric or electro-hydraulic brake system.

2. Description of the Prior Art

Not only in an electric brake system of a vehicle in which a braking force is directly generated from an electric current supplied from a battery of the vehicle but also in an electro-hydraulic brake system of a vehicle recently developed in a high variety as described in, for example, U.S. patent application Ser. No. 09/263,226 by the same assignee as the present application, in which a pump is driven by a battery of the vehicle to provide a pressurized brake fluid source, so that wheel cylinders of wheels are selectively supplied with the pressurized brake fluid from the source under a control of solenoid-actuated on-off valves, it is essential that the battery is operating at its normal condition.

In Japanese Patent Laid-open Publication 7-17375, it is described that in a brake system in which a brake oil pressure is normally controlled by a solenoid control valve according to a duty ratio of a control current supplied from a battery, when a lowering of the output voltage of the battery is detected by a voltage sensor, the duty ratio control is stopped, while the control valve is maintained at a constant position.

It is not correctly checked if a battery is in a normally operating condition or not when no substantial load is imposed on the battery. Therefore, it is considered to check the battery during an operation of the brake system, such that, for example, the output voltage thereof is detected by a sensor when the brake pedal is depressed beyond a predetermined depth. However, those modern electro-hydraulic brake systems under the recent high variety developments are mostly adapted to execute various automatic behavior controls such as anti-spin controls, anti-driftout controls, anti-overroll controls, etc. depending upon separate applications of a controlled braking to each of the generally four wheels, and therefore, the operation of the brake system is an integration of a driver's braking intention and a control calculation of an automatic behavior controller constructed by an electronic computer. Therefore, in those modern electro-hydraulic brake systems it is very difficult to check the battery operating condition under its prescribed loading condition.

SUMMARY OF THE INVENTION

In view of the above-mentioned problems concerned with an appropriate maintenance of the battery of a vehicle such as an automobile equipped with such a modern electrohydraulic brake system, it is a primary object of the present invention to provide a device for controlling such a modern electrohydraulic brake system with respect to the maintenance of a battery forming the electric power source thereof.

According to the present invention, the above-mentioned primary object is accomplished by a device for controlling an electro-hydraulic brake system of a vehicle having wheels, a battery and the electro-hydraulic brake system adapted to be energized by the battery and including wheel cylinders, a brake pedal, electric control means, a pump adapted to operate under a control of the electric control means for pressurizing a brake fluid, and on-off valves adapted to operate under a control of the electric control means for selectively supplying the brake fluid pressurized by the pump to each of the wheel cylinders, the device comprising:

means for detecting if vehicle speed is substantially zero;

means for detecting if the brake pedal is not substantially depressed; and means for detecting output voltage of the battery;

wherein the electric control means control the pump and at least one of the on-off valves such that, when the vehicle speed detection means detect a substantially zero vehicle speed, while the brake pedal depression detection means detect substantially no depression of the brake pedal, the pump is operated with the at least one on-off valve being opened to supply the brake fluid pressurized by the pump to a corresponding one of the wheel cylinders for a predetermined time period, with the battery output voltage detection means detecting the output voltage of the battery in the meanwhile, whereby the device judges the battery to be in a normal operating condition when the battery output voltage detected by the battery output voltage detection means in the meanwhile is not lower than a predetermined value.

By the device of the above-mentioned construction, the electro-hydraulic brake system of a vehicle is controlled such that the operating condition of the battery is checked always at a prescribed loading condition to be always correctly judged of the operating condition. Further, although such a prescribed loading of the battery for the checking of the operating condition thereof results in a substantial braking of at least one of the wheels of the vehicle, since it occurs while the vehicle is at a standstill, no disadvantageous effect is thereby encountered. When it was judged by the device that the output voltage of the battery in such a prescribed loading condition is lower than the predetermined value, it will be a matter of course that the fact is informed to the driver by an appropriate warning device such as a red lamp or the like.

According to an embodiment of the present invention, the electric control means may further control the operation of the pump so as to lower a delivery pressure thereof when the output voltage of the battery is lower than the predetermined value. By lowering the delivery pressure of the pump, the brake system will be able to operate normally for a longer time before the battery is repaired or replaced by a new one. The pump delivery pressure can be optionally lowered by appropriately lowering the voltage of the electric power supplied to a motor for driving the pump.

Further, when the delivery pressure of the pump is lowered as described above, it is desirable that the electric control means also control the operation of the pump so as to slower an acceleration of the pump. By so controlling, the consumption of the battery is lessened. The acceleration of the pump is optionally controlled by appropriately restricting the current of the electric power supplied to the pump drive motor.

When the vehicle is a four-wheeled vehicle having a pair of front wheels and a pair of rear wheels, the prescribed loading of the battery may be so arranged that the electric control means open the on-off valves for supplying the brake fluid to the wheel cylinders of the front left wheel and the rear right wheel, together with the operation of the pump.

Or, alternatively, the arrangement may be such that the electric control means open the on-off valves for supplying the brake fluid to the wheel cylinders of the front right wheel and the rear left wheel, together with the operation of the pump.

Or, further, the arrangement may be such that the electric control means open the on-off valves for supplying the brake fluid to the wheel cylinders of the front left wheel and the rear right wheel, together with the operation of the pump at one time of checking the battery, and open the on-off valves for supplying the brake fluid to the wheel cylinders of the front right wheel and the rear left wheel, together with the operation of the pump at a next time of checking the battery, and alternately so on.

BRIEF DESCRIPTION OF THE DRAWINGS

In the accompanying drawings,

FIG. 1A is a diagrammatical illustration of an example of a hydraulic circuit of an electro-hydraulic brake system in which the brake control device according to present invention is incorporated;

FIG. 1B is a diagrammatical illustration of an embodiment of the electric control means forming an essential part of the brake control device according to the present invention;

FIG. 2 is a flowchart showing an embodiment of the brake control device according to the present invention in the form of a series of functions thereof;

DESCRIPTION OF THE PREFERRED EMBODIMENT

Figure 3:
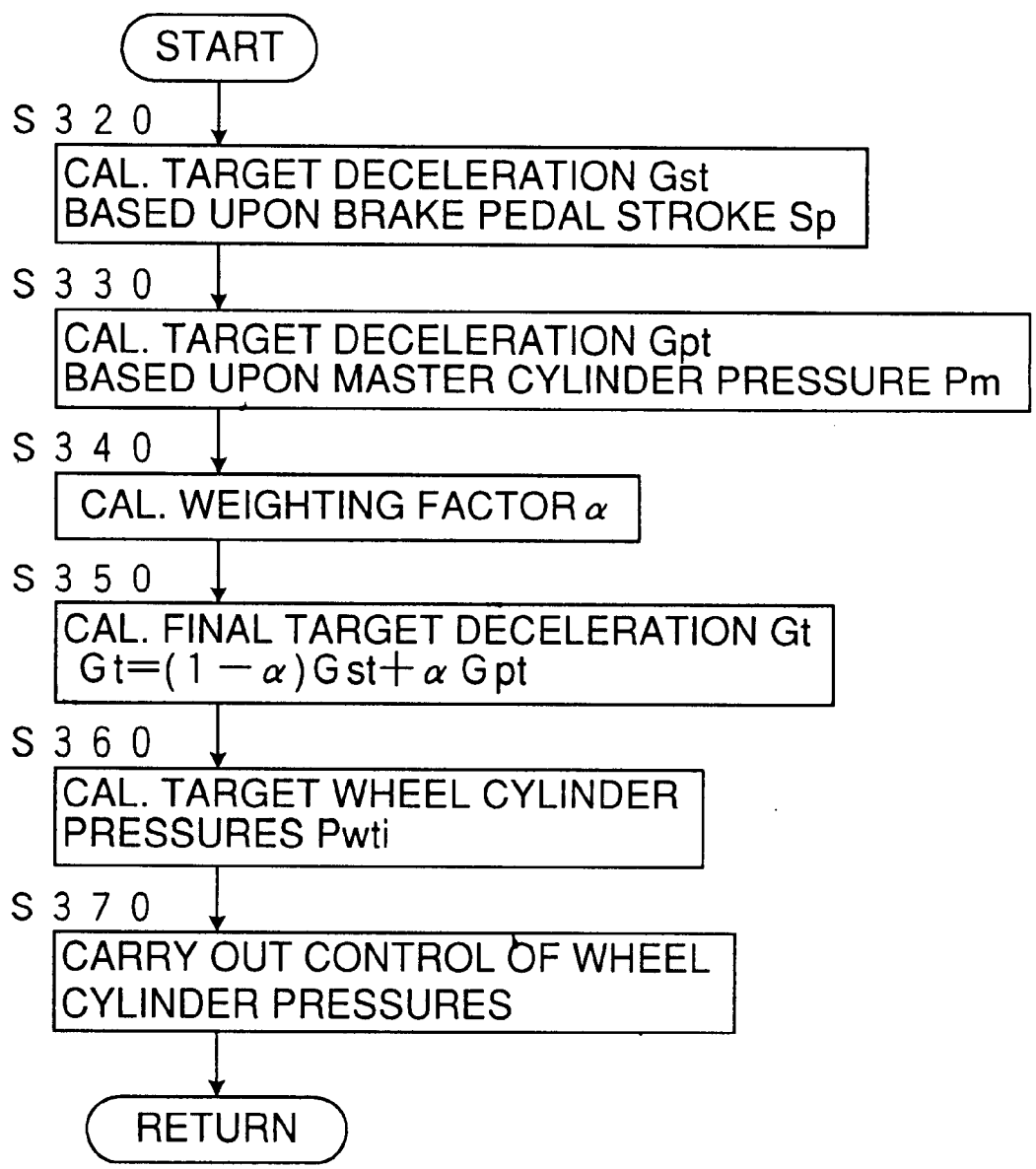
FIG. 3 is a flowchart showing a detailed embodiment of a part of the flowchart shown in FIG. 2, indicating a normal braking operation of the brake system when not battery checking is executed.

In the following, the present invention will be described in more detail with respect to a preferred embodiment thereof by referring to the accompanying drawings.

Referring to FIG. 1A, the hydraulic circuit totally designated by 10 of a brake system of a vehicle (not shown) and having pairs of front and rear wheels (not shown) comprises wheel cylinders 20FR, 20FL, 20RR and 20RL for applying braking forces to front right, front left, rear right and rear left ones of the wheels, respectively. The hydraulic circuit comprises a master cylinder 14 adapted to compress a brake fluid supplied from a reservoir 26 according to a depression of a brake pedal 12 by a driver, so as to deliver a pressurized brake fluid through passages 16 and 18 toward the wheel cylinders 20FL and 20FR, respectively. On-off valves 22FL and 22FR are provided in the passages 16 and 18, respectively, so as normally not to obstruct communication of the passages 16 and 18, while selectively interrupting the communication of the passages 16 and 18, respectively. Indeed, the on-off valves 22FL and 22FR are solenoid actuated valves which are maintained in a through open condition such as shown in the figure when no electric current is supplied thereto, while they are changed over to a position interrupting the communication of the passages 16 and 18, respectively, when they are supplied with an electric current when an ignition switch (not shown) is turned on, provided that the output voltage of a battery (not shown) of the vehicle is not lower than a threshold value, as described in detail hereinbelow.

Therefore, it will be appreciated that the shown hydraulic circuit is ready for braking the pair of front wheels simply hydraulically according to a depression of the brake pedal 12 when the ignition switch is not turned on or the electric power source of the vehicle has failed for any reason, while when the ignition switch is turned on with a sound battery condition, the on-off valves 22FR and 22RL are changed over to their closed position of interrupting the passages 16 and 18, so as to let the hydraulic circuit ready for operation with the brake fluid pressure source provided by a pump 34 under the control of electric control means described hereinbelow.

The pump 34 is adapted to be selectively driven by an electric motor 32 powered by the above-mentioned battery via control means described in detail hereinbelow, so as to pump up the brake fluid supplied from the reservoir 26 through a suction passage 28 for providing a pressurized source of the brake fluid in an outlet passage 29 branching to passages 36FR, 36FL, 36RR and 36RL for supplying the pressurized brake fluid to the wheel cylinders 20FR, 20FL, 2ORR and 2ORL through on-off valves 40FR, 40FL, 4ORR and 4ORL, respectively. An accumulator 31 may be connected to the outlet passage 29. The on-off valves 40FR, 40FL, 40RR and 40RL are each of a normally closed type which maintains each of the supply passages 36FR, 36FL, 36RR and 36RL in an interrupted condition when no electric current is supplied thereto, and is selectively opened by a supply of an actuating electric current thereto.

The wheel cylinders 20FR, 20FL, 20RR and 20RL are exhaustible through exhaust passages 38FR, 38FL, 38RR and 38RL including on-off valves 42FR, 42FL, 42RR and 42RL, respectively, toward an exhaust passage 30 leading to the reservoir 26. The on-off valves 42FR, 42FL, 42RR and 42RL are each also of a normally closed type which maintains each of the exhaust passages 38FR, 38FL, 38RR and 38RL in an interrupted condition when no electric current is supplied thereto, and is selectively opened by a supply of an actuating electric current.

The pressures of the brake fluid in the wheel cylinders 20FR, 20FL, 20RR and 20RL are detected by pressure sensors 44FR, 44FL, 44RR and 44RL, respectively. The pressure of the brake fluid compressed by the master cylinder 14 is detected by a pressure sensor 48. The pressure of the brake fluid in the outlet passage 29 is detected by a pressure sensor 50.

The changeover of each of the on-off valves 22FR and 22FL, the on-off valves 40FR–40RL and the on-off valves 42FR–42RL is controlled by electric control means 52 diagrammatically shown in FIG. 1B, or in more detail, by a microcomputer 54 thereof through a drive circuit 56. The microcomputer may be of a common type including a central processor unit (CPU), a read only memory (ROM), a random access memory (RAM), input and output port means and bi-lateral bus means interconnecting these elements, all not shown in detail in the figure.

The microcomputer 54 is supplied with signals of pressures Pi (i=fr, fl, rr and rl) of the brake fluid in the corresponding wheel cylinders from the wheel cylinder pressure sensors 44FR–44RL, a signal of depression stroke Sp of the brake pedal 12 by a driver from a brake pedal stroke sensor 46, a signal of master cylinder pressure Pm of the brake fluid compressed by the master cylinder 14 from the master cylinder pressure sensor 48, a signal of the pressure of the brake fluid in the pump outlet passage 29 from the powered source pressure sensor 50, a signal of the output voltage Ve of the battery (not shown) forming the electric power source of the vehicle from a battery voltage sensor 58, signals of wheel speeds Vwi (i=fr, fl, rr and rl) of the front right, front left, rear right and rear left wheels from wheel speed sensors 60FR–60RL, and a signal of stop lamp switch (STSW) 62 for putting on and off the brake lamps (not shown) of the vehicle according to a depression of the brake pedal by the driver, and carries out certain control calculations based upon the values of the parameters input by the signals from the sensors 44FR–44RL, 46, 48, 50, 58 and 60FR–60RL for checking the operating condition of the battery when a particular condition therefor is met as described hereinbelow, while otherwise executing the normal braking operation via the drive circuit 56 according to the depression of the brake pedal 12 by the driver, and still other behavior controls which, however, do not form a part of the present invention. 64 is a warning lamp described in detail hereinbelow for warning the driver of the battery being not operating in a normal operating condition.

Now, referring to FIGS. 2–6, the device for controlling the brake system according to the present invention will be described in detail in the form of its operation of controlling the brake system shown in FIGS. 1A and 1B.

Referring to FIG. 2, when the device is started for operation by a closure of the ignition switch (not shown), in step 10 signals such as shown in FIG. 1B are read in.

In step 20, it is judged if the vehicle speed V, which may be obtained from the wheel speeds Vwi, is substantially zero, and the stop lamp switch (STSW) 62 is off. When the answer is no, the control proceeds to step 30 for a normal braking operation such as described later with reference to FIG. 3. In other words, when the two conditions of step 20 are not simultaneously met, the battery check intended by the present invention is not suited to be executed. The condition that the vehicle is stopped with the engine on while the brake pedal is not substantially depressed by the driver will often be available when the vehicle is being prepared for a driving.

When the answer of step 20 is yes, the control proceeds to step 40, and a timer is set, and then in step 50, it is judged if time T has passed more than a predetermined time Tc since the timer was last set. The time Tc is an interval set for a desirable successive checking of the battery.

When the answer is no, the control proceeds to step 30, while when the answer is yes, the control proceeds to step 60, and it is judged if a flag F1 is 0. The flag F1 is 0 at the first pass, as it is initialized to 0 at each startup of the engine. When the answer of step 70 is yes, the control proceeds to step 70, while when the answer of step 70 is no, the control proceeds to step 80.

In step 70, the pump 34 is driven by supplying an electric power to the motor 32 from the battery, while opening the valves 40FL and 40RR, for the purpose of imposing a certain substantial load on the battery. In step 80, the pump 34 is driven, while the valves 40FR and 40RL are opened in the same manner for the same purpose.

Then, in step 90, it is judged if the output voltage Ve of the battery is lower than a predetermined threshold value Vec. The voltage Vec is so determined that if the answer is yes, the battery must be judged to have lost its normal operating condition. When the answer of step 90 is yes, the control proceeds to step 100, and a flag F2 is set to 1. When the answer of step 90 is no, the control proceeds to step 110, and the flag F2 is set to 0. In either case, the control further proceeds to step 120, and it is judged if the flag F1 is 0. When the control has passed step 70, the answer is yes, while when the control has passed step 80, the answer is no.

When the answer of step 120 is yes, the control proceeds to step 130, and the pump driving started in step 70 is stopped, while the on-off valves 40FL and 40RR opened in step 70 are closed. When the answer of step 120 is no, the control proceeds to step 140, and the pump driving started in step 80 is stopped, while the on-off valves 40FR and 40RL opened in step 80 are closed. When the control has come to step 150 from step 130, the flag F1 is set at 1, while when the control has come to step 160 from step 140, the flag F1 is set at 0.

In either case of coming to step 150 or 160, the control proceeds to step 170, and it is judged if the flag F2 is 1. When the answer is yes, i.e. when the battery is not in its normal operating condition, the control proceeds to step 180, and the micro-computer 54 restricts the voltage of the electric power supplied from the battery to the motor 32 to be lower than the normal voltage level, whereby the delivery pressure of the pump 34 is correspondingly lowered from its normal pressure level. Then, in step 190, the micro-computer 54 restricts the current of the electric power supplied from the battery to the motor 32 to be lower than the normal current level, whereby the acceleration of the pump 34 in its start of driving is correspondingly lowered from its normal acceleration. Then, in step 200, the warning lamp 62 is put on. By such restrictions of the voltage and the current, the battery will be protected from rapidly losing its ability before it is repaired or replaced.

As will be noted from the alternating reversal of the flag F1 between 0 and 1 in relation to steps 70 and 80 or steps 130 and 140, the battery checking is executed by alternately braking one of the two pairs of diagonally opposite wheels.

When the answer of step 170 is no, i.e. when the battery was checked to be in its normal operating condition, the control proceeds to step 210, and the motor drive voltage by the battery is reset to its normal voltage. When it is set at the normal voltage, it is only to reset the voltage to the same value. Then, in step 220, the motor drive current is also reset to its normal current value.

When it is set at the normal current, it is only to reset the current to the same value. Then, in step 230, the warning lap 62 is reset to its off state. When it is set at the off state, it is only to reset it to the same off state.

The judgment of step 90 will be available in a moment much less than a second, including the time required for the preparation of step 70 or 80, while the process of step 130 or 140 will also need only a moment. Thus, it will be appreciated that the essential processes for the checking of the battery operating condition according to step 70 or 80 to step 130 or 140 are finished in a moment when the vehicle is held in a substantial standstill with the brake pedal not being substantially depressed by the driver, without causing any shock in the vehicle in spite of a substantial actuation of the brake system.

When the control proceeds to step 30 as will be in a most part of the vehicle operation period, the brake system shown in FIGS. 1A and 1B operates, as an embodiment, as shown in the flowchart of FIG. 3. The operation shown in FIG. 3 has already been proposed by the colleges of the present inventor in copending U.S. patent application Ser. No. 09/263,226.

Figure 4:
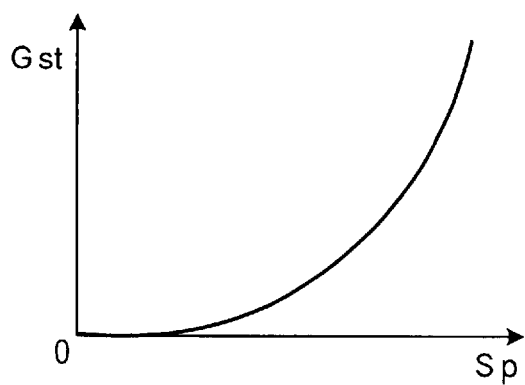
FIG. 4 is a graph showing an example of the performance of target deceleration Gst vs. brake pedal depression stroke Sp, i.e. a value of deceleration of the vehicle to be attained by the brake pedal being depressed to a corresponding depression stroke.

Briefly reproducing the operation for information, in step 320, by looking up a map such as shown in FIG. 4 stored in the ROM of the microcomputer 54, a target deceleration Gst is read out against a current value of the depression stroke Sp of the brake pedal by the driver.

Figure 5:
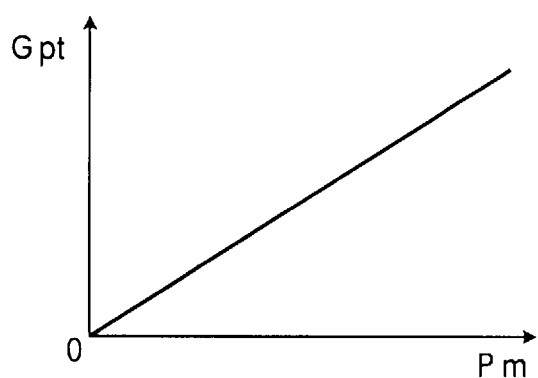
FIG. 5 is a graph showing an example of the performance of target deceleration Gpt vs. master cylinder pressure Pm, i.e. a value of deceleration of the vehicle to be attained by the brake pedal being depressed to generate a corresponding value of the master cylinder pressure.

In step 330, by looking up a map such as shown in FIG. 5 stored in the ROM, a target deceleration Gpt is read out against a current value of the master cylinder pressure Pm.

Figure 6:
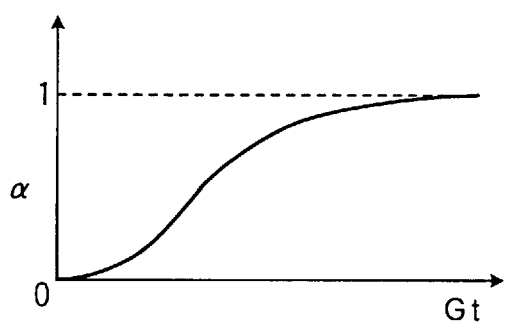
FIG. 6 is a graph showing an example of the performance of weighting factor α vs. final target deceleration Gt, i.e. a factor for weighting the target deceleration Gpt dependent of the master cylinder pressure in determining the braking force to be applied to the wheels according to a weighted combination of the target decelerations Gpt and Gst.

In step 340, by looking up a map such as shown in FIG. 6 stored in the ROM, a weighting factor α for weighting the target deceleration Gpt based upon the master cylinder pressure Pm against the target deceleration Gst based upon the brake pedal depression stroke Sp is estimated against total target deceleration Gt which is a weighted sum of the target decelerations Gpt and Gst by the weighting factor a according to the following equation:

$$Gt=(1-\alpha)Gst+\alpha\, Gpt$$

In the brake control carried out according to the repetitive calculations of the steps of FIG. 3, the reading out of the weighting factor a by the map of FIG. 6 is executed based upon the value of Gt obtained by each previous cycle of the calculations through the flowchart of FIG. 3.

According to such a rightward rising slope shape of the curve of FIG. 6, the weighting of the parameters in the estimation of the deceleration of the vehicle to be targeted at is gradually shifted from a weighting on the brake pedal depression stroke to a weighting on the master cylinder pressure along with increase of the target deceleration, i.e. as a higher braking force is applied to the wheels.

In step 360, target wheel cylinder pressures Pwti (i=fr, fl, rr and rl) are calculated based upon the total target deceleration Gt, possibly with incorporation of other control calculations for vehicle stability control known in various ideas in the art of the computer control of automobiles.

In step 370, the microcomputer 54 outputs the control signals based upon the calculations in step 360 to the drive circuit 56 so that the motor 32, the on-off valves 22FR and 22FL, 40FR–40RL and 42FR–42RL are correspondingly operated to generate a corresponding braking force at each of the wheels.

Although the present invention has been described in detail with respect to a particular embodiment thereof, it will be apparent for those skilled in the art that various modifications are possible without departing from the scope of the present invention.

What is claimed is:

1. A device for controlling an electro-hydraulic brake system of a vehicle having wheels, a battery and the electro-hydraulic brake system adapted to be energized by the battery and including wheel cylinders, a brake pedal, electric control means, a pump adapted to operate under a control of the electric control means for pressurizing a brake fluid, and on-off valves adapted to operate under a control of the electric control means for selectively supplying the brake fluid pressurized by the pump to each of the wheel cylinders, the device comprising:

means for detecting if vehicle speed is substantially zero;

means for detecting if the brake pedal is not substantially depressed; and means for detecting output voltage of the battery;

wherein the electric control means control the pump and at least one of the on-off valves such that, when the vehicle speed detection means detect a substantially zero vehicle speed, while the brake pedal depression detection means detect substantially no depression of the brake pedal, the pump is operated with the at least one on-off valve being opened to supply the brake fluid pressurized by the pump to a corresponding one of the wheel cylinders for a predetermined time period, with the battery output voltage detection means detecting the output voltage of the battery in the meanwhile, whereby the device judges the battery to be in a normal operating condition when the battery output voltage detected by the battery output voltage detection means in the meanwhile is not lower than a predetermined value.

2. A device according to claim 1, wherein the electric control means control the operation of the pump so as to lower a delivery pressure thereof when the output voltage of the battery is lower than the predetermined value.

3. A device according to claim 2, wherein the electric control means control the operation of the pump so as to slower an acceleration of the pump when the output voltage of the battery is lower than the predetermined value.

4. A device according to claim 1, wherein the vehicle is a four-wheeled vehicle having a pair of front wheels and a pair of rear wheels, and the electric control means open the on-off valves for supplying the brake fluid to the wheel cylinders of the front left wheel and the rear right wheel, together with the operation of the pump.

5. A device according to claim 1, wherein the vehicle is a four-wheeled vehicle having a pair of front wheels and a pair of rear wheels, and the electric control means open the on-off valves for supplying the brake fluid to the wheel cylinders of the front right wheel and the rear left wheel, together with the operation of the pump.

6. A device according to claim 1, wherein the vehicle is a four-wheeled vehicle having a pair of front wheels and a pair of rear wheels, and the electric control means open the on-off valves for supplying the brake fluid to the wheel cylinders of the front left wheel and the rear right wheel, together with the operation of the pump at one time of checking the battery, and open the on-off valves for supplying the brake fluid to the wheel cylinders of the front right wheel and the rear left wheel, together with the operation of the pump at a next time of checking the battery, and alternately so on.

* * * * *